July 1, 1924.
A. C. RECKER
LIP STICK HOLDER
Filed Aug. 10, 1923
1,499,784
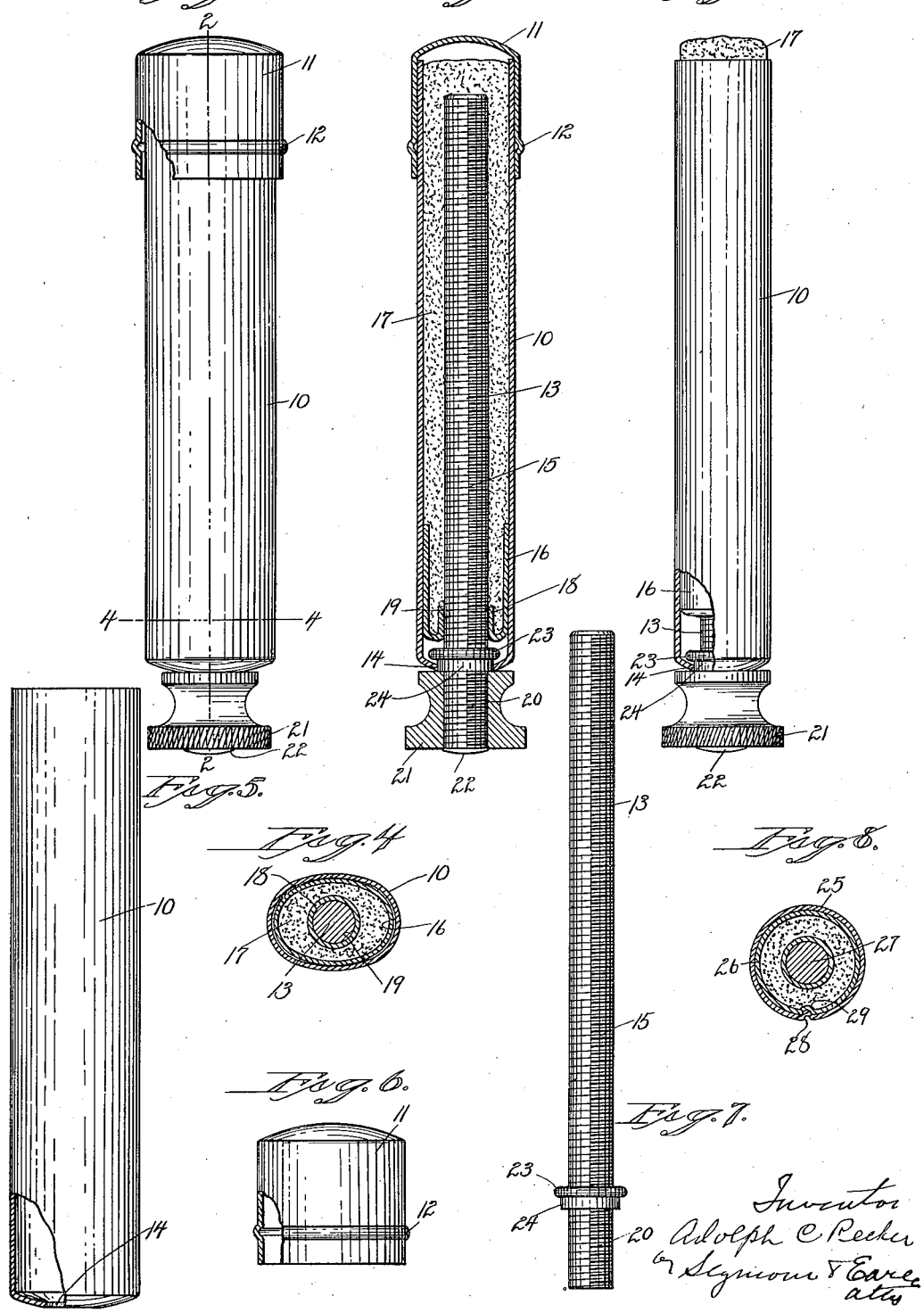

Patented July 1, 1924.

1,499,784

UNITED STATES PATENT OFFICE.

ADOLPH C. RECKER, OF OAKVILLE, CONNECTICUT, ASSIGNOR TO THE CHASE COMPANIES INC., OF WATERBURY, CONNECTICUT, A CORPORATION.

LIP-STICK HOLDER.

Application filed August 10, 1923. Serial No. 656,640.

*To all whom it may concern:*

Be it known that I, ADOLPH C. RECKER, a citizen of the United States, residing at Oakville, in the county of Litchfield and State of Connecticut, have invented a new and useful Improvement in Lip-Stick Holders; and I do hereby declare the following, when taken in connection with the accompanying drawings and the characters of reference marked thereon, to be a full, clear, and exact description of the same, and which said drawings constitute part of this application, and represent, in—

Fig. 1 an enlarged view in elevation of a lip-stick holder constructed in accordance with my invention, one corner of the cap being broken away.

Fig. 2 a view thereof in longitudinal section on the line 2—2 of Fig. 1.

Fig. 3 an edge view of the device, with the cap removed and a corner of the lower end of the tubular cosmetic-container broken away.

Fig. 4 a view in transverse section on the line 4—4 of Fig. 1.

Fig. 5 a detached view of the tube partly in elevation and partly in section.

Fig. 6 a corresponding view of the removable cap.

Fig. 7 a detached view of the feed-screw.

Fig. 8 a view in transverse section of a modification of my improvement, showing the employment of a cylindrical cosmetic-container and follower, instead of an oval cup and follower, as shown in the preceding figures.

My invention relates to an improved lip-stick holder, the object being to produce, at a low cost, a simple, compact, attractive and effective toilet-accessory of the character described.

With these ends in view, my invention consists in a lip-stick holder having certain details of construction and combination of parts as will be hereinafter described and particularly pointed out in the claim.

In carrying out my invention, as shown in Figures 1 to 7 inclusive, I employ a tubular cosmetic-container 10, oval in cross-section and having its open outer end normally closed by a removable cap 11 formed with a bead 12 and held in place by friction. The said container houses a feed-screw 13 rotatable, but not longitudinally movable, extending nearly to its open outer end and projecting through a bearing-opening 14 in its inner end. The main portion of the said feed-screw is threaded, as at 15, for the operation of a cup-shaped follower 16, which receives the inner end of the stick of cosmetic 17, which is crowded into the open end of the container in the form of a stiff paste. The inner end of the said cup is turned inwardly and outwardly to form a flange 18, the inner face of which is threaded, as at 19, conformably to the threading 15 of the screw. For the operation of the screw, its projecting inner end 20 is threaded for the reception of a threaded nut 21 upon which it is headed down, as at 22, whereby the nut is fastened to it to turn with it. The said screw is also provided with a collar 23 positioned upon it to engage with the bottom of the container adjacent to the bearing-opening 14 therein, and so co-acting with the inner face of the nut 21 in preventing the screw 13 from endwise movement except of a very slight character. A bearing-shoulder 24 interposed between the collar 23 and the projecting portion 20 of the screw, fits within the bearing-opening 14 in the container 10.

The device having been made as described and assembled, the container is filled with any suitable cosmetic 17 in the form of a paste, the screw having previously been reversely operated, so as to carry the follower-cup 16 to the bottom of the container, as shown in Figure 2. Thereafter, the nut 21 is turned clockwise little by little, from time to time, as required, to slowly expel the stick of cosmetic from the open end of the container, as it is gradually worn away in use.

In the modified construction shown in Figure 8, the cosmetic-container 25 is made cylindrical in form and receives a cylindrical, cup-shaped follower 26 operated by a feed-screw 27, the tube and follower being crimped, as at 28 and 29, whereby they are held against relative rotation.

I claim:

In a lip-stick holder, the combination with a tubular cosmetic-container having its lower end contracted to form a concentric bearing-opening, of a feed-screw located in the said container and having its lower end threaded and extended downward through the said bearing-opening, a follower located within the container and operated by the said feed-screw, a nut applied to the said projecting lower end of the feed-screw, its upper face being abutted against the outer face of the lower end of the said container so as to close the concentric bearing-opening thereof, a bearing-shoulder located upon the said screw between the inner and projecting ends thereof and fitting within the said bearing-opening, and a collar located upon the screw adjacent to the said bearing-shoulder in position to engage with the inner face of the lower end of the container for preventing the screw from downward displacement with respect thereto.

In testimony whereof, I have signed this specification in the presence of two subscribing witnesses.

ADOLPH C. RECKER.

Witnesses:
JOHN W. HARD,
JOHN S. NEAGLE.